United States Patent [19]
Mizuno et al.

[11] Patent Number: 4,956,136
[45] Date of Patent: Sep. 11, 1990

[54] METHOD OF MOLDING SKIN-COVERED FOAMED PLASTIC ARTICLE

[75] Inventors: Hisayoshi Mizuno; Fumio Nara, both of Kanagawa, Japan

[73] Assignee: Ikeda Bussan Co., Ltd., Ayase, Japan

[21] Appl. No.: 353,582

[22] Filed: May 18, 1989

Related U.S. Application Data

[63] Continuation-in-part of Ser. No. 123,472, Nov. 19, 1987, abandoned.

[30] Foreign Application Priority Data

Nov. 21, 1986 [JP] Japan ................ 61-179323

[51] Int. Cl.$^5$ ........................................ B29C 67/22
[52] U.S. Cl. .......................... 264/46.6; 264/46.4; 264/275
[58] Field of Search ............... 264/46.4, 46.6, 46.8, 264/275, 278; 297/DIG. 1

[56] References Cited

U.S. PATENT DOCUMENTS

| | | | |
|---|---|---|---|
| 3,971,112 | 7/1976 | Amato et al. | 264/46.6 |
| 4,089,919 | 5/1978 | Sanson | 264/46.6 |
| 4,323,406 | 4/1982 | Morello | 264/46.4 |

FOREIGN PATENT DOCUMENTS 0210587  2/1987  European Pat. Off. ........ 264/46.8

Primary Examiner—Jan H. Silbaugh
Assistant Examiner—Allan R. Kuhns
Attorney, Agent, or Firm—Foley & Lardner, Schwartz, Jeffery, Schwaab, Mack, Blumenthal & Evans

[57] ABSTRACT

A method of molding a skin-covered foamed plastic article, which employs an elastically deformable belt for assuring a positioning of a bag-shaped skin member in a mold during a molding process. The mold has in the cavity thereof at least one longitudinally curved elongate ridge for providing engagement with a stitched portion of the skin member. The belt is connected to an inner wall of the bag-shaped skin member, so that upon proper placement of the skin member in a mold, the belt is expanded thereby to press the stitched portion against the elongate ridge of the mold. With this, the skin member is tightly held in the mold during curing or foaming process of a liquid material in the mold.

12 Claims, 3 Drawing Sheets

METHOD OF MOLDING SKIN-COVERED FOAMED PLASTIC ARTICLE

This is a continuation-in-part application of Ser. No. 07/123,472 filed Nov. 19, 1987, now abandoned.

BACKGROUND OF THE INVENTION

1. Field of the Invention

The present invention relates in general to a method of molding a foamed plastic article, and more particularly to a method of molding a skin-covered foamed plastic article, which comprises the steps of placing a skin member in a mold in a manner to intimately cover the wall of the cavity of the mold, pouring a liquid material of foamed plastic into the cavity, curing the material and removing a product, viz., a skin-covered foamed plastic article from the mold upon sufficient hardening of the material 2. Description of the Prior Art In order to clarify the task of the present invention, one conventional method of molding a skin-covered foamed plastic article will be described with reference to FIGS. 4, 5 and 6 of the attached drawings.

Referring to FIG. 4 of the drawings, there is shown a seat 100 including a seat cushion 102 and a seatback 104 which are produced by the conventional molding method using such a mold 106 as shown in FIG. 6. As is seen from FIG. 5, which shows a cross section taken along the line V—V of FIG. 4, the seatback 104 (or seat cushion 102) comprises a foamed plastic 108 serving as a structural base of the seatback 104 and a skin member 110 intimately and integrally attached to the foamed plastic 108. The skin member 110 comprises an outer skin of cloth and an inner skin of wadding. As is seen from FIG. 5, the skin member 110 has two inwardly projected stitched portions 112a and 112b each extending along one side portion of the bag-shaped skin member 110. As is seen from FIG. 6, the mold 106 has a cavity 114 formed therein. Two longitudinally curved elongate ridges 116a and 116b extend along respective side walls of the cavity 114 to serve as skin member holders.

The conventional method of molding the seatback 104 (or seat cushion 102) is as follows:

First, the mold 106 is warmed to a predetermined temperature. Then, a skin member 110 in the form of a bag is put into the cavity 114 of the mold 106 with its mouth portion opened upward. Upon proper setting of the skin member 110 in the mold 106, the stitched portions 112a and 112b of the skin member 110 are suitably engaged with the two longitudinally curved elongate ridges 116a and 116b to assure positioning of the same with respect to the mold 106. Then, a liquid material of foamed plastic is poured into the cavity 114, and a lid 118 is placed on the mold 106, as is seen from FIG. 6. After a while, that is, after the material is cured or hardened to a certain level, a skin-covered foamed plastic article, viz., the seatback 104 is removed from the mold 106.

However, in the conventional method as described hereinabove, it is very difficult or at least troublesome to properly and tightly set the skin member 110 in the right position in the cavity 114 of the mold 106. In fact, during curing of the material in the mold 106, the stitched portions 112a and 112b of the skin member 110 would be disengaged from the ridges 116a and 116b due to vigorous foaming of the material therein. Of course, this causes deterioration in quality of the products.

SUMMARY OF THE INVENTION

It is therefore an essential object of the present invention to provide an improved method of molding a skin-covered foamed plastic article, which is free of the above-mentioned drawbacks.

In accomplishing the foregoing object there has been provided, in accordance with one aspect of the present invention, a method of molding a skin-covered foamed plastic article, which comprises the steps of (a) preparing a mold which has a cavity formed therein, the cavity having at its inner wall at least one longitudinally curved elongate ridge extending along the wall; (b) preparing a skin member which has a stitched portion, the skin member further having at the stitched portion at least one elastically deformable belt connected thereto; (c) putting the skin member in the cavity in such a manner that the stitched portion of the skin member is held by the elongate ridge while being pressed against the elongate ridge by a force produced by the elastically deformable belt; (d) placing a lid on the mold in a manner to close the cavity of the mold; (e) pouring a liquid material of foamed plastic into the cavity the inner wall of which is kept covered with the skin member; and (f) removing, upon sufficient curing of the material, the lid from the mold and taking out from the mold a hardened product of foamed plastic comprising the elastically deformable belt.

In accordance with another aspect of the present invention, there has been provided a skin-covered foamed plastic article produced by the above-recited method.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings, in which.

DETAILED DESCRIPTION OF THE INVENTION

Figure 3:
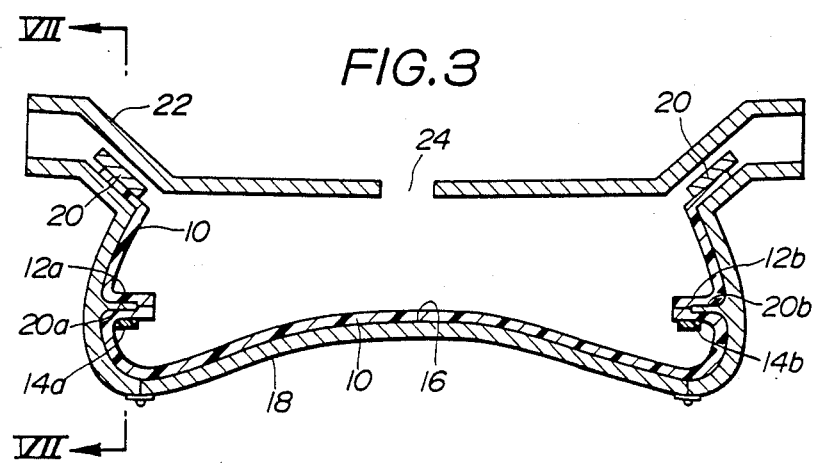
FIG. 3 is a sectional view of a mold employed in the method of the present invention, with the skin member properly set in the mold.
Figure 4:
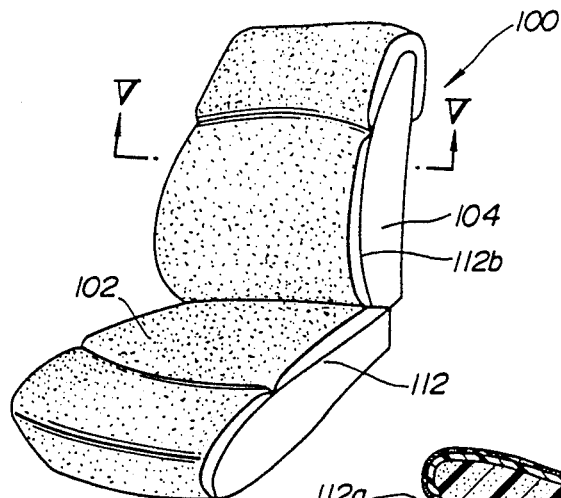
FIG. 4 is a perspective view of a seat for a motor vehicle, which has a seat cushion and a seatback which are produced through the conventional molding method as described hereinabove.
Figure 5:
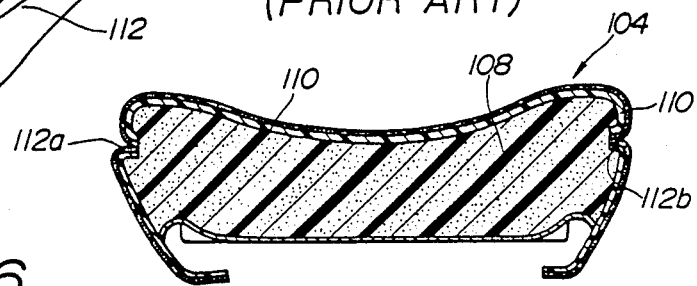
FIG. 5 is a sectional view taken along the line V—V of FIG. 4.
Figure 6:
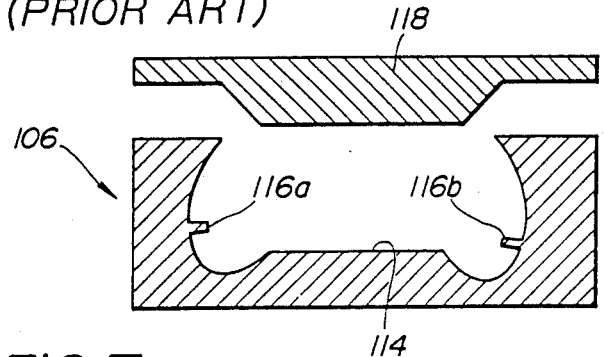
FIG. 6 is a sectional view of a mold and a lid which are employed in the conventional molding method.

In the following, a preferred embodiment of an improved method of molding a skin-covered foamed plastic article will be described in detail with reference to FIGS. to 3 and 7 to 11. For this molding, such a mold 18 as shown in FIG. 3 is used. As is seen from this drawing and FIG. 7, two longitudinally curved elongate ridges 20a and 20b are formed on the lateral sides of the inner walls of the cavity 16 of the mold 18, like the aforementioned mold 106. Each ridge 20a or 20b is formed with a turn-back portion 20a', (see FIG. 7).

First, a skin member 10 in the form of a bag is prepared. Like the skin member 110 as mentioned hereinabove, the skin member 10 comprises an outer skin of cloth and an inner skin of wadding, and the skin member 10 has two inwardly projected stitched portions 12 which extend along the lateral sides of the skin member 10 respectively.

Figure 2:
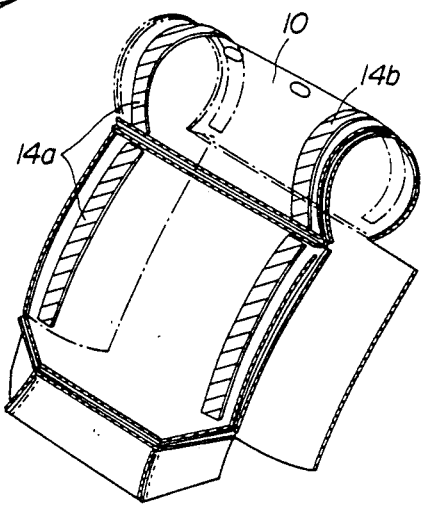
FIG. 2 is a schematically illustrated perspective view of a bag-shaped skin member which is turned inside-out, showing two rubber belts attached to the back surface of the skin member.

As is seen from FIGS. 2 and 3, two rubber belts 14a and 14b are respectively connected to the stitched portions 12a and 12b of the skin member 10 in a manner to extend along the same. It is to be noted that in this embodiment the connection therebetween is made by stitching only the longitudinally opposed ends of each belt 14a or 14b to the associated portions of the skin member 10. Preferably, a rubber belt having a width of about 10 mm to 20 mm is used. Of course, a rubber thread having a circular cross section may be also used.

The bag-shaped skin member 10 is then put in the cavity 16 of the mold 18 in such a manner that the stitched portions 12a and 12b of the skin member 10 are engaged with and held by the longitudinally curved elongate ridges 20a and 20b of the mold 18, as is understood from FIG. 3 and FIGS. 7-11.

Figure 8:
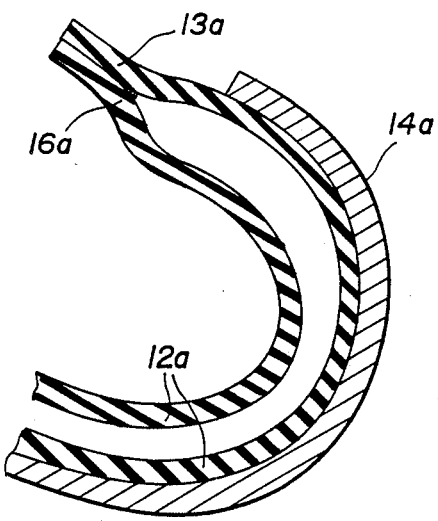
FIG. 8 is an enlarged sectional view showing details of an end of the seam formed on one side of the bag-shaped skin member by one of the stitched sections.
Figure 11:
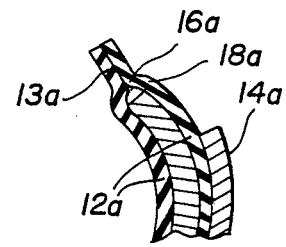
FIG. 11 is an enlarged sectional view showing details of the end of the seam and its relation to the end of the ridge.
Figure 9:
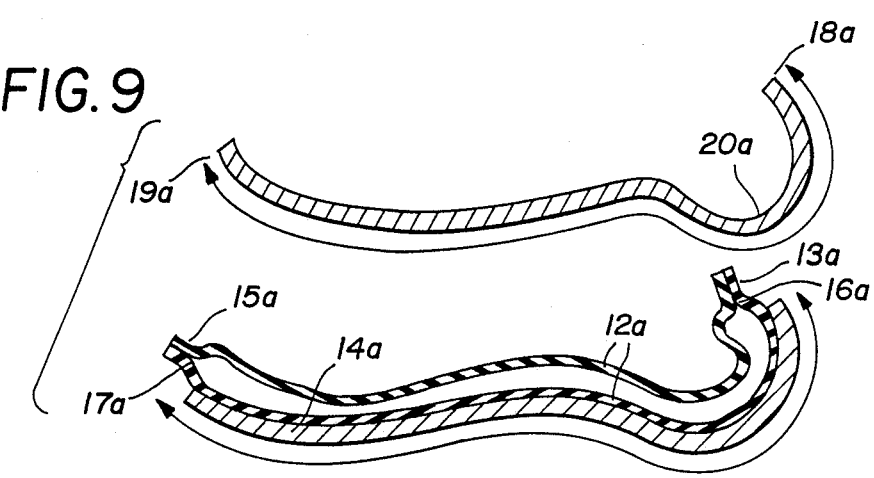
FIG. 9 is a schematic view of the relative lengths of the curved elongate ridge and the seam before the bag-shaped skin member is mounted.

As shown in FIG. 8, the stitched portion 12a is sealed at stitched end 13a, which terminates at end point 16a. The corresponding stitched end 15a and end point 17a are shown in FIG. 9, as are the terminal points 18a and 19a of ridge 20a. In FIG. 9, the skin member 10 is in a slightly contracted state. As a result, the distance between terminal points 18a and 19a, measured along the curve of the ridge, is slightly greater than the distance between end points 16a and 17a, measured along the curve of the seam as indicated.

Figure 10:
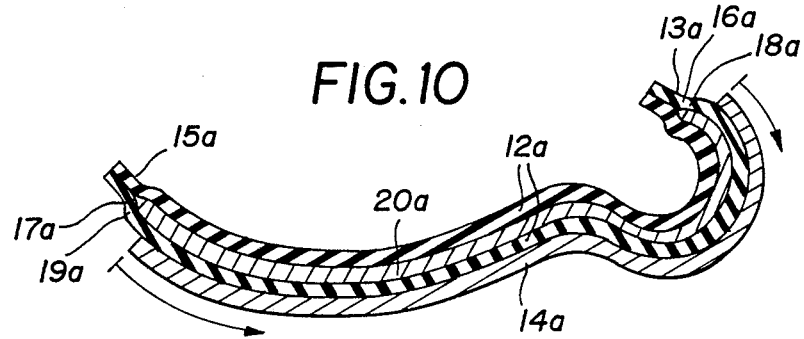
FIG. 10 is a schematic view of the relative lengths of the ridge and the seam after the skin member is mounted and the belt is placed in tension.

Thus, when the skin member 10 is properly set in the mold 18, the skin member is slightly stretched. As shown in FIG. 10, when the skin member is set, the ridge 20a is engaged in the seam formed by the stitched portion 12a. As a result, the distance between end point 16a and 17a is now approximately the same as the distance between terminal points 18a and 19a. This can be seen in more detail in FIG. 11, which shows end point 16a immediately adjacent terminal point 18a.

Figure 7:
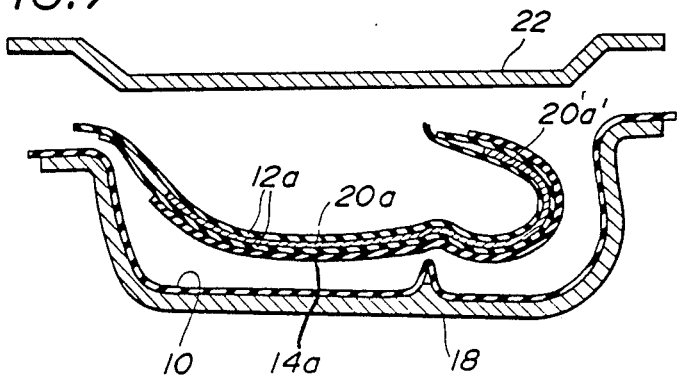
FIG. 7 is a sectional view taken along the line VII—VII of FIG. 3 with some parts omitted from illustration.

As is best seen from FIGS. 7 and 10, upon proper setting of the skin member 10 in the mold 18, each rubber belt 14a or 14b is somewhat expanded thereby to tightly press the stitched portion 12a or 12b against the longitudinally curved elongate ridge 20a or 20b. Thus, in FIG. 10, the extended belt 14a begins to contract, tending to pull end points 16a and 17a toward the middle of the belt. However, once the end points are in contact with the ridge terminal points 18a and 19a, further relative motion is prevented and the skin member is held firmly in place.

Once the skin member 10 is mounted in the mold 18, a skin member holder 20 is set to the mouth portion of the mold 18 to hold the upper portion of the skin member 10 relative to the mold 18. Next, a lid 22 having an opening 24 is placed on the mold 18.

Then, a liquid material of foamed plastic, such as material for foamed polyurethane or the like, is poured through the opening 24 into the cavity 16 of the mold 18, more specifically, into the bag-shaped skin member 10 in the mold 18. Although not shown in the drawings, a suitable clamping device is used for clamping the lid 22. Thus, thereafter, the material is forced to cure in the limited space which is defined by the bag-shaped skin member 10 and the lid 22.

Figure 1:
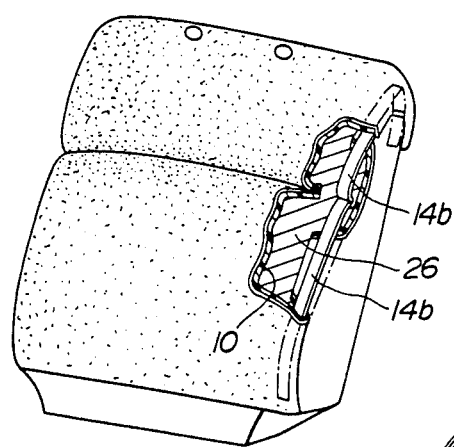
FIG. 1 is a partially broken perspective view of a seatback which is produced according to the method of the present invention.

After a given time for which the material is cured or hardened to a sufficient level, the lid 22 is removed and a product, viz., the skin-covered foamed plastic article is removed from the mold 18. If the mold 18 is constructed to be dividable into several pieces, the release of the product from the mold 18 is greatly facilitated. With this, the article as shown in FIG. 1 is provided, which comprises a foamed plastic 26 serving as a structural base of the seatback, a skin member 10 intimately covering and integrally attached to the foamed plastic and two rubber belts 14a and 14b disposed therein.

As will be understood from the foregoing description, in the method according to the present invention, the rubber belts 14a and 14b are used for achieving tight setting or positioning of the skin member 10 relative to the mold 18. The undesirable displacement of the skin member 10 during the curing or foaming process of the material in the mold is consequently suppressed. Thus, in accordance with the present invention, it is possible to provide a well finished product.

What is claimed is:

1. A method of molding a skin-covered foamed plastic article which comprises the steps of
    (a) preparing a mold which has a cavity formed therein, said cavity having at an inner wall at least one longitudinally curved elongate ridge which extends along the wall;
    (b) preparing a bag-shaped skin member which has a stitched portion, said skin member further having at said stitched portion at least one elastically deformable belt connected to said skin member and extending along said stitched portion, said stitched portion sealed at end points of said skin member;
    (c) putting said skin member in said cavity, while stretching said belt, in such a manner that said stitched portion of said skin member engages said elongate ridge while being pressed against said elongate ridge by a force produced due to said stretching; and holding said skin member in place against said elongate ridge by contraction of the stretched belt pulling said end points into contact with terminal points of said elongate ridge;
(d) placing a lid on said mold in a manner to close said cavity of the mold;
(e) pouring a liquid foamable material for foamed plastic into said bag-shaped skin member; and
(f) removing, upon sufficient curing of the material, said lid from said mold and taking out from said mold a hardened product of foamed plastic comprising said elastically deformable belt.

2. A method as claimed in claim 1, in which said elastically deformable belt is connected at its longitudinally opposed ends to an inner wall of the bag-shaped skin member.

3. A method as claimed in claim 2, in which said elastically deformable belt comprises a rubber belt.

4. A method as claimed in claim 1, further comprising, before the step (c), the step of placing a skin member holder on a mouth portion of said mold to hold a given portion of said skin member.

5. A method as claimed in claim 4, in which said pouring of said liquid foamable material into said cavity of the mold is made through an opening formed in said lid.

6. A method as claimed in claim 5, in which said skin member comprises an outer skin of cloth and an inner skin of wadding.

7. A method as claimed in claim 3, in which said elastically deformable belt is stitched to said skin member.

8. A method as claimed in claim 7, in which said elastically deformable belt has a width ranging from approximately 10 mm to approximately 20 mm.

9. A method as claimed in claim 7, in which said elastically deformable belt is a rubber belt having a circular cross section.

10. A method as claimed in claim 1, in which said mold has two elongate ridges which extend along side walls of said cavity, and in which said skin member has two inwardly projected stitched portions which extend along inner side portions of said bag-shaped skin member.

11. A method as claimed in claim 1, wherein said elastically deformable belt is in the form of an elongated strip comprising either a rectangular or a circular cross-section.

12. A method as claimed in claim 7, wherein said elastically deformable belt is stitched to said skin member such that said skin member requires slight elongation in order properly to engage said elongate ridge, whereby said elastically deformable belt is slightly expanded.

* * * * *